(12) United States Patent
Huang et al.

(10) Patent No.: US 11,399,506 B2
(45) Date of Patent: Aug. 2, 2022

(54) PET FEEDING DEVICE

(71) Applicant: CHANG YANG MATERIAL CORP., Changhua County (TW)

(72) Inventors: Ming-Hua Huang, Changhua County (TW); Lung-Hsun Song, Changhua County (TW); Dong-Jhou Lee, Changhua County (TW); Kuan-Ting Chen, Changhua County (TW); Chia-Hui Chen, Changhua County (TW)

(73) Assignee: CHANG YANG MATERIAL CORP., Changhua County (TW)

( * ) Notice: Subject to any disclaimer, the term of this patent is extended or adjusted under 35 U.S.C. 154(b) by 0 days.

(21) Appl. No.: 17/081,999

(22) Filed: Oct. 27, 2020

(65) Prior Publication Data

US 2021/0176956 A1 Jun. 17, 2021

(30) Foreign Application Priority Data

Dec. 17, 2019 (TW) .................................. 108216781

(51) Int. Cl.
*A01K 5/02* (2006.01)
*A01K 15/02* (2006.01)
*A01K 5/00* (2006.01)
*A01K 5/01* (2006.01)

(52) U.S. Cl.
CPC ................ *A01K 5/025* (2013.01); *A01K 5/00* (2013.01); *A01K 5/0114* (2013.01); *A01K 15/025* (2013.01)

(58) Field of Classification Search
CPC ........ A01K 5/00; A01K 5/0114; A01K 5/025; A01K 15/025

USPC ......................................................... 119/61.5
See application file for complete search history.

(56) References Cited

U.S. PATENT DOCUMENTS

| 948,794 A | * | 2/1910 | Peifer | .................... A01K 5/015 |
| | | | | 119/62 |
| 2,086,631 A | * | 7/1937 | Munro | .................. A01K 15/025 |
| | | | | 119/711 |
| 3,554,533 A | * | 1/1971 | Cox | ..................... B21D 43/003 |
| | | | | 271/267 |
| 3,751,750 A | * | 8/1973 | Kaftan | .................... A47L 13/16 |
| | | | | 15/220.2 |
| 4,505,228 A | * | 3/1985 | Scott | ...................... A01K 5/025 |
| | | | | 119/62 |

(Continued)

*Primary Examiner* — Timothy D Collins
*Assistant Examiner* — Nicholas Leo Seneczko
(74) *Attorney, Agent, or Firm* — CKC & Partners Co., LLC

(57) ABSTRACT

A pet feeding device includes an accommodating body, a cover, a pivoting assembly and a counterweight. The accommodating body has an accommodating space. The cover is pivotally connected to the accommodating body and to close or open the accommodating space. The pivoting assembly is connected to the accommodating body and the cover and for pivotally connecting the cover on the accommodating body. The counterweight is separately connected to the accommodating body and includes a swinging end and a positioning end. The swinging end has a curved surface and is disposed on one end of the counterweight. The positioning end is disposed on the other end of the counterweight. When the swinging end of the counterweight contacts a ground, the pet feeding device is in a rolling state, and when the positioning end of the counterweight contacts the ground, the pet feeding device is in a positioning state.

12 Claims, 6 Drawing Sheets

(56) References Cited

U.S. PATENT DOCUMENTS

| | | | | |
|---|---|---|---|---|
| 5,351,650 A * | 10/1994 | Graves | A01K 15/025 | 119/707 |
| 5,445,110 A * | 8/1995 | Birnie | A01K 5/0128 | 119/61.5 |
| 5,722,348 A * | 3/1998 | Phillips | A01K 1/03 | 119/421 |
| 5,758,604 A * | 6/1998 | Jørgensen | A63F 9/0078 | 119/711 |
| 5,954,011 A * | 9/1999 | Martinez | A01K 5/025 | 119/62 |
| 6,073,581 A * | 6/2000 | Wang | A01K 5/0114 | 119/51.01 |
| 7,600,486 B2 * | 10/2009 | Ellis | A01K 7/005 | 119/61.5 |
| 7,624,705 B2 * | 12/2009 | Plante | A01K 1/03 | 119/474 |
| 8,381,684 B2 * | 2/2013 | Crawford | A01K 5/0114 | 119/61.5 |
| 9,288,969 B2 * | 3/2016 | Christianson | A01K 5/0291 | |
| 9,661,829 B2 * | 5/2017 | Sternal | A01K 15/027 | |
| 9,709,218 B1 * | 7/2017 | Mchatet | F16M 11/2014 | |
| 10,285,380 B1 * | 5/2019 | Mullin | A01K 15/026 | |
| 10,973,207 B1 * | 4/2021 | Ettehadieh | A01K 15/025 | |
| 2002/0115377 A1 * | 8/2002 | Herrenbruck | A01K 15/025 | 446/475 |
| 2007/0125306 A1 * | 6/2007 | Beecher | A01K 5/025 | 119/51.02 |
| 2009/0026348 A1 * | 1/2009 | Sopel | A01K 15/025 | 248/686 |
| 2009/0314221 A1 * | 12/2009 | Wang | A01K 15/025 | 119/707 |
| 2014/0373788 A1 * | 12/2014 | Ragonetti | A01K 15/025 | 119/51.01 |
| 2015/0101546 A1 * | 4/2015 | Simon | A01K 15/025 | 119/710 |
| 2015/0128875 A1 * | 5/2015 | Christianson | A01K 5/0114 | 119/707 |
| 2015/0245593 A1 * | 9/2015 | O'Mara | A63H 29/22 | 446/457 |
| 2016/0120146 A1 * | 5/2016 | Parness | A01K 5/0114 | 119/61.4 |
| 2016/0227738 A1 * | 8/2016 | Ausman | A01K 5/025 | |
| 2016/0309682 A1 * | 10/2016 | Stone | A01K 15/025 | |
| 2017/0188546 A1 * | 7/2017 | Ormsbee | H05B 47/16 | |
| 2017/0208776 A1 * | 7/2017 | Ma | A01K 15/025 | |
| 2017/0303509 A1 * | 10/2017 | Stone | A01K 5/00 | |
| 2018/0077897 A1 * | 3/2018 | Christianson | G02B 5/0278 | |
| 2018/0242554 A1 * | 8/2018 | Vance | A01K 15/025 | |
| 2019/0098864 A1 * | 4/2019 | Simon | A01K 15/025 | |
| 2019/0216049 A1 * | 7/2019 | Yuan | A01K 15/021 | |
| 2019/0289824 A1 * | 9/2019 | Yang | A01K 5/02 | |
| 2019/0343077 A1 * | 11/2019 | Boshears | A01K 15/025 | |

* cited by examiner

US 11,399,506 B2

PET FEEDING DEVICE

RELATED APPLICATIONS

This application claims priority to Taiwan Application Serial Number 108216781, filed Dec. 17, 2019, which is herein incorporated by reference.

BACKGROUND

Technical Field

The present disclosure relates to a pet feeding device. More particularly, the present disclosure relates to a pet feeding device with an interactive feeding function and a stationary feeding function.

Description of Related Art

In recent years, the pet economy is booming, more and more pet supplies are developed due to demand. There are many kinds of pet feeding devices on the market, but most of them are static devices which have lack of entertainment and cannot arouse the interest of pet.

Therefore, a feeding device which can interact with pet is released. The interest of pet can be aroused by the movement of the feeding device and drive the pet to exercise, so that the pet can be entertained and eat at the same time. Therefore, the interest of the pet with less appetite can be aroused, and the activity of fat pet can be increased, so that the physical and mental health of pet can be effectively improved. In order to move freely, the structure of the above-mentioned interactive pet feeding device is mostly spherical. However, the spherical pet feeding device has the disadvantages of free rolling and lacking positioning function, which leads the environment being messy.

Therefore, it is worth for related companies to develop a pet feeding device with the interacting function and the positioning function.

SUMMARY

According to one aspect of the present disclosure, a pet feeding device includes an accommodating body, a cover, a pivoting assembly and a counterweight. The accommodating body has an accommodating space. The cover is pivotally connected to the accommodating body and to close or open the accommodating space. The pivoting assembly is connected to the accommodating body and the cover and for pivotally connecting the cover on the accommodating body. The counterweight is separately connected to the accommodating body and includes a swinging end and a positioning end. The swinging end has a curved surface and is disposed on one end of the counterweight. The positioning end is disposed on the other end of the counterweight. When the swinging end of the counterweight contacts a ground, the pet feeding device is in a rolling state, and when the positioning end of the counterweight contacts the ground, the pet feeding device is in a positioning state.

According to another aspect of the present disclosure, a pet feeding device includes an accommodating body, a cover and a counterweight. The accommodating body has an accommodating space. The cover is detachably connected to the accommodating body to close or open the accommodating space. The counterweight is connected to the cover. When the cover closes the accommodating space, the pet feeding device is in a rolling state, and when the cover opens the accommodating space and the cover is assembled on one end of the accommodating body after being separated, the pet feeding device is in a positioning state.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
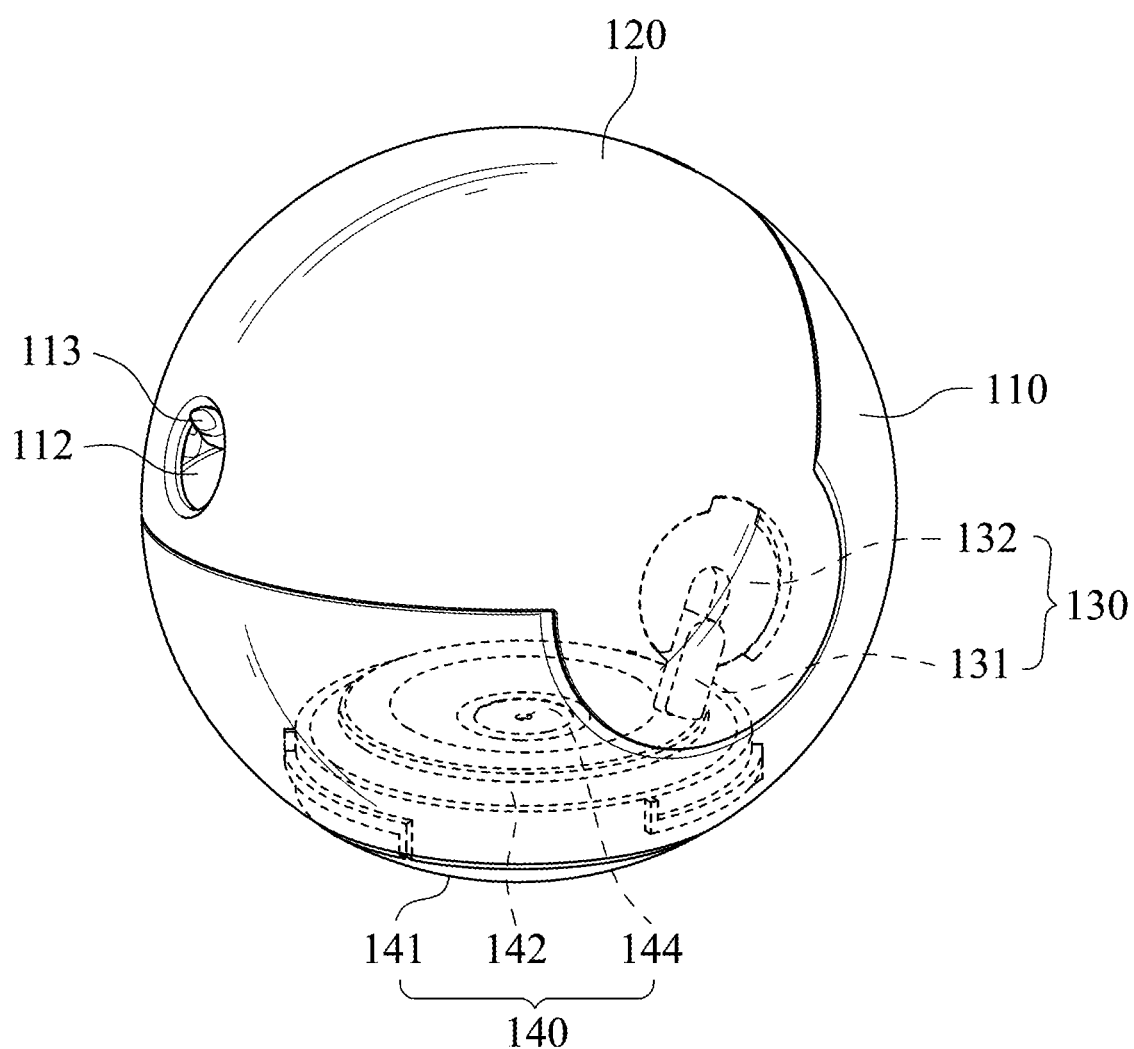
FIG. 1 is a schematic view of a pet feeding device according to one embodiment of the present disclosure.
Figure 2:
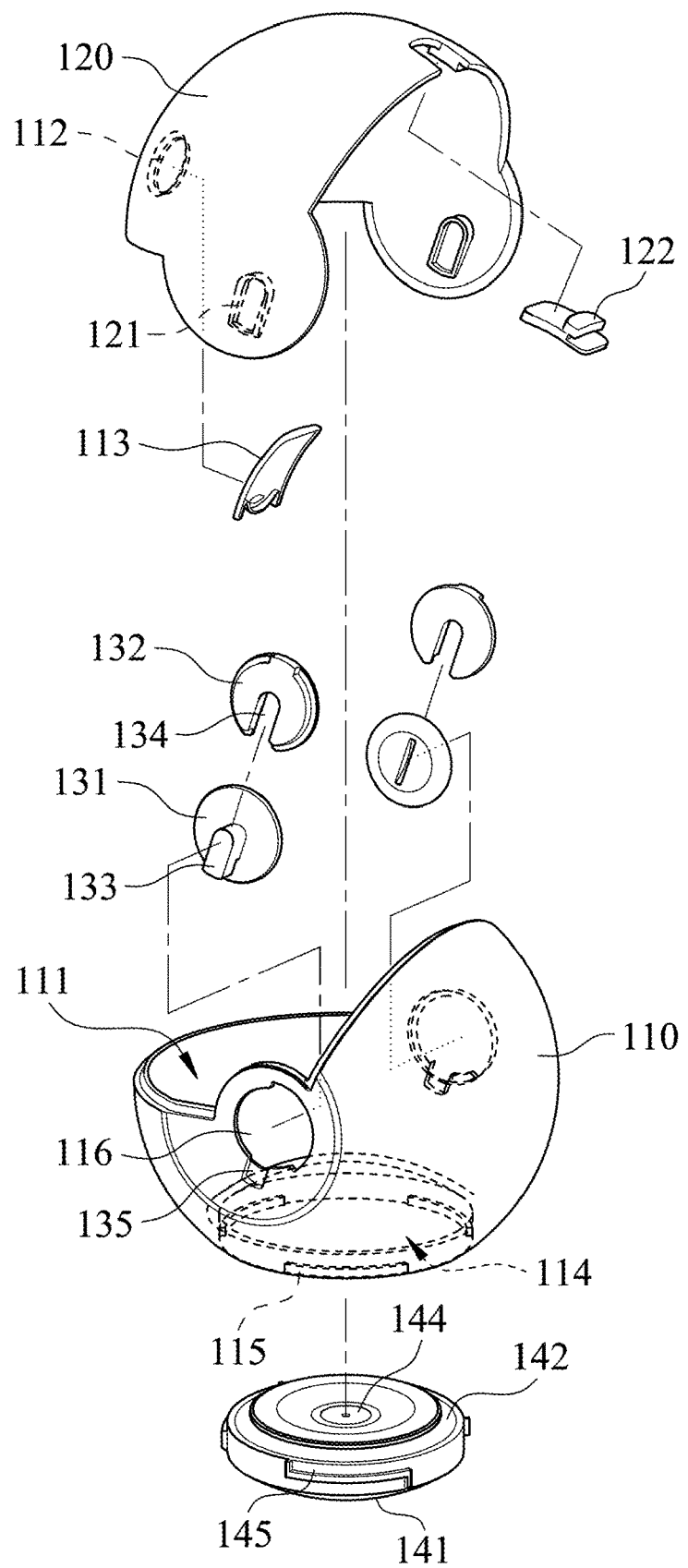
FIG. 2 is an exploded view of the pet feeding device of FIG. 1.
Figure 3A:
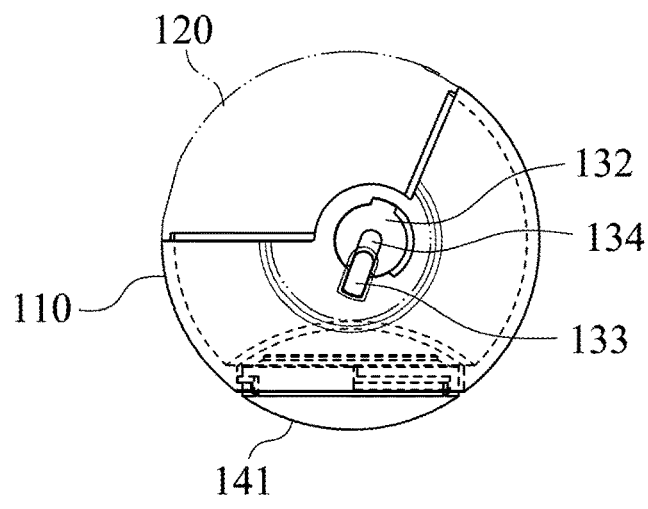
FIG. 3A is a side view of the pet feeding device of FIG. 1.
Figure 3B:
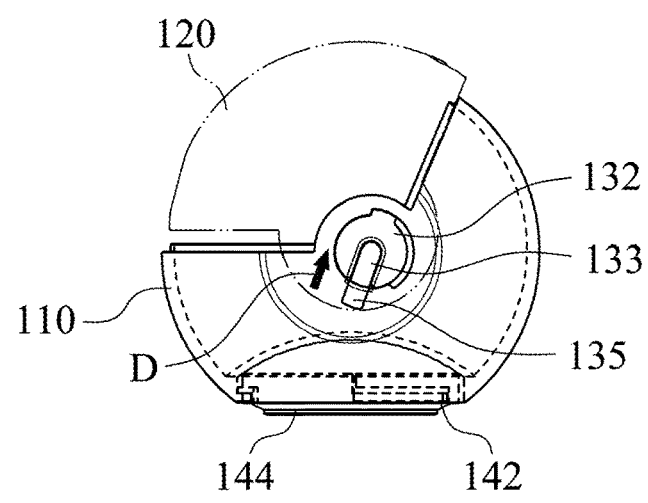
FIG. 3B is a side view of another state of the pet feeding device of FIG. 1.

FIG. 1 is a schematic view of a pet feeding device 100 according to one embodiment of the present disclosure. FIG. 2 is an exploded view of the pet feeding device 100 of FIG. 1. FIG. 3A is a side view of the pet feeding device 100 of FIG. 1. FIG. 3B is a side view of another state of the pet feeding device 100 of FIG. 1. As shown in FIGS. 1 and 2, the pet feeding device 100 includes an accommodating body 110, a cover 120, pivoting assemblies 130 and a counterweight 140.

The accommodating body 110 has an accommodating space 111 for filling feed. The cover 120 is pivotally connected to the accommodating body 110 and to close or open the accommodating space 111. The pivoting assemblies 130 are connected to the accommodating body 110 and the cover 120, and are for pivotally connecting the cover 120 on the accommodating body 110. In FIG. 1, the number of the pivoting assemblies 130 is two. The counterweight 140 is separately connected to the accommodating body 110 and includes a swinging end 141 and a positioning end 142. The swinging end 141 has a curved surface and is disposed on one end of the counterweight 140. The positioning end 142 is disposed on the other end of the counterweight 140. When the swinging end 141 of the counterweight 140 contacts a ground, the pet feeding device 100 is in a rolling state (as shown in FIG. 3A). When the positioning end 142 of the counterweight 140 contacts the ground, the pet feeding device 100 is in a positioning state (as shown in FIG. 3B).

Since the structural configuration of the counterweight 140 being detachable from the accommodating body 110, the owner can selectively contact the swinging end 141 or the positioning end 142 of the counterweight 140 with the ground to change the usage state of the pet feeding device 100 according to the usage requirements. Therefore, the pet feeding device 100 can have the stationary feeding function and the interactive entertainment function, and the application range of the pet feeding device 100 can be expanded.

The weight of the counterweight 140 can be greater than the weight of the accommodating body 110 and the cover 120. More specifically, the counterweight 140 can control the position of the center of gravity of the pet feeding device 100 and control the center of gravity of the pet feeding device 100 deviate from the center of thereof. Therefore, when the pet feeding device 100 is in the rolling state, the balance of the pet feeding device 100 can be maintained by the counterweight 140, so that the pet feeding device 100 can shake like a tumbler, and the accommodating space 111 can be kept facing towards in one direction. When the pet feeding device 100 is in the positioning state, the pet feeding device 100 can be connected to the ground more stably through the counterweight 140.

Please refer to the FIGS. 3A and 3B again. Specifically, in FIG. 3A, the swinging end 141 of the counterweight 140 is contacted to the ground, and the pet feeding device 100 is in the rolling state. In FIG. 3B, the positioning end 142 of the counterweight 140 is contacted to the ground, and the pet feeding device 100 is in the positioning state.

In detail, in FIG. 3A, the swinging end 141 of the counterweight 140 is contacted to the ground, and then the counterweight 140 controls the center of gravity of the pet feeding device 100 to deviate from the center of the pet feeding device 100, and keeps the accommodation space 111 facing upward. Further, the pet feeding device 100 can shake irregularly like the tumbler by the structure of the curved surface of the swinging end 141. When the owner or the pet exert force on the pet feeding device 100, the pet feeding device 100 may shake or roll irregularly, so that the interest of the pet can be aroused and the function of playing and entertainment can be provided to the pet.

As shown in FIG. 3B, when the pet feeding device 100 is in the positioning state, the positioning end 142 of the counterweight 140 is contacted to the ground. The positioning end 142 can be a planer structure. The center of gravity of the pet feeding device 100 can be closer to the ground through the arrangement of the counterweight 140. Therefore, the pet feeding device 100 can be placed on the ground more stably to avoid being dumped by accidental collision.

Please refer to FIG. 2 again, the end of the accommodating body 110 being connected to the counterweight 140 can have a combination groove 114. The shape of the combination groove 114 corresponds to the curved structure of the swinging end 141 of the counterweight 140; that is, when the pet feeding device 100 is in the positioning state, the swinging end 141 of the counterweight 140 is correspondingly engaged in the combination groove 114. Therefore, the accommodating body 110 can be more stably connected to the counterweight 140 when the pet feeding device 100 is in the positioning state.

The counterweight 140 can include a magnet assembly (not shown) and a suction cup 144. The suction cup 144 is disposed on the positioning end 142 and exposed on the counterweight 140. The suction cup 144 is linked with the magnet assembly. When the magnet assembly is forced, the magnet assembly drives the suction cup 144 being in an attaching state or a non-attaching state. Further, in the embodiment of FIG. 1, the positioning end 142 is forced to force the magnet assembly, and the magnet assembly drives the suction cup 144 to be in the attaching state. When the force on the positioning end 142 is released, the force on the magnet assembly is released, and the magnet assembly drives the suction cup 144 to be in the non-attaching state. In detail, when the positioning end 142 of the counterweight 140 is not under force, the balance of the magnetic force of the magnet assembly can be maintained in the counterweight 140, and the suction cup 144 can be driven to being in the non-attaching state. When the counterweight 140 is under force, the balance of the magnetic force of the magnet assembly is broken, and the suction cup 144 can be driven to being in the attaching state, and at this time, there is a vacuum between the suction cup 144 and the ground. Therefore, the positioning end 142 of the counterweight 140 can be more firmly connected to the ground by the arrangement of the suction cup 144. The attaching state can be released by removing the force, so that the purpose of convenient operation can be achieved.

Figure 3C:
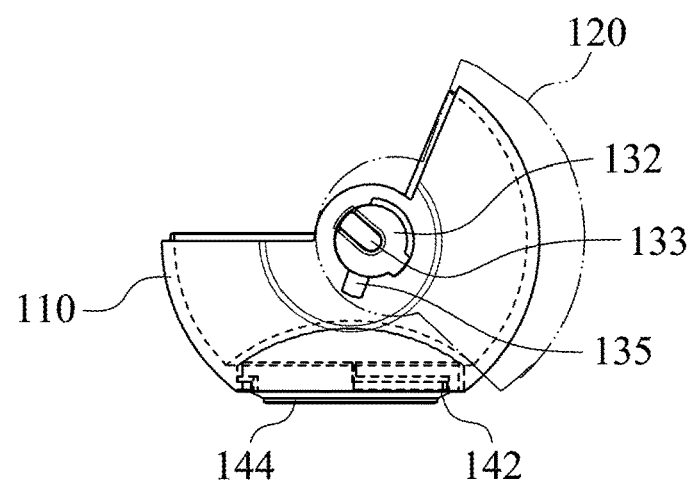
FIG. 3C is a side view of the still another state of the pet feeding device of FIG. 1.

FIG. 3C is a side view of the still another state of the pet feeding device 100 of FIG. 1. As shown in FIG. 3C, the cover 120 can be pivoted to the accommodating body 110 to open and close the accommodating space 111 of the accommodating body 110. When the pet feeding device 100 is in the positioning state and the accommodating space 111 is opened by the cover 120 to the accommodating body 110, the pet feeding device 100 can be used as a pet bowl and can provide a stationary feeding function. When the pet does not eat the feed, the owner can pivot the cover 120 to close the accommodating space 111 of the accommodating body 110, so as to keep the feed in the accommodating space 111 fresh. Furthermore, by the arrangement of the suction cup 144 of the counterweight 140, the stability of the connection between the pet feeding device 100 and the ground can be further increased. Therefore, it can avoid the pet feeding device 100 tipping when the pet is eating.

Further, the cover 120 is pivotally connected to the accommodating body 110 by the pivoting assemblies 130. In the embodiment of FIG. 1, the number of the pivoting assemblies 130 can be two, which are disposed symmetrically on both sides of the pet feeding device 100, respectively, but the present disclosure will not be limited thereto.

Please refer to FIG. 2 again, each of the pivoting assemblies 130 can include a shaft element 131 and a pivoting element 132. The shaft elements 131 are connected to the accommodating body 110 and the cover 120. The pivoting elements 132 are connected to the shaft elements 131 and drive the cover 120 to pivot. In detail, the pivoting elements 132 are disposed between the shaft elements 131 and the cover 120, and are engaged in mounting holes 116 of the accommodating body 110. Each of the shaft elements 131 has a protruding portion 133 which can be engaged in a jointing hole 121 of the cover 120. Each of the pivoting elements 132 has a sliding groove 134 for sliding the protruding portion 133 and driving the cover 120 to move. The accommodating body 110 has limiting grooves 135. In FIG. 2, the number of the limiting grooves 135 is two. The limiting grooves 135 extend from the mounting holes 116 and are used for limiting the position of the protruding portion 133 of each of the shaft elements 131.

Specifically, please refer to FIGS. 3A to 3C again. In the FIG. 3A, the cover 120 is tightly closed to the accommodating body 110, and the protruding portions 133 of the shaft elements 131 are embedded in the limiting grooves 135 of the accommodating body 110, so that the cover 120 cannot be pivoted to the accommodating body 110. In FIG. 3B, when the owner want to pivot the cover 120, the cover 120 is pulled in a direction D to slide the protruding portions 133 of the shaft elements 131 along the sliding grooves 134 of the pivoting elements 132, and the protruding portions 133 of the shaft elements 131 are separated from the limit of the limiting grooves 135 of the accommodating body 110. Then the cover 120 can be pivoted by the pivoting elements 132 through the shaft elements 131. Therefore, the cover 120 can be opened or closed to the accommodating space 111 more stably.

As shown in FIG. 3A, the accommodating body 110, the cover 120 and the counterweight 140 have the same radius of curvature, and the accommodating body 110, the cover 120 and the counterweight 140 are spherical after being completely combined. Therefore, when the cover 120 is pulled up in the direction D, a gap between the cover 120 and the accommodating body 110 is generated. Since the accommodating body 110 and the cover 120 have the same radius of curvature, the cover 120 will not be limited by the shape of the accommodating body 110 during pivoting. Therefore, the operation of the pivoting assemblies 130 can be more smooth and convenient.

It should be mentioned that, in other embodiments, the cover 120 and the accommodating body 110 can be connected in other ways, such as connected by a turning shaft, a hinge or a gear, so as to meet different application requirements, but the present disclosure will not be limited thereto.

In addition, in order to disassemble and assemble the counterweight 140 more conveniently, the counterweight 140 can have a plurality of threads 145, and the accommodating body 110 can have a plurality of thread grooves 115. The position of each of the thread grooves 115 corresponds to the position of each of the threads 145. Therefore, the accommodating body 110 and the counterweight 140 of the pet feeding device 100 can be connected in a screwing manner. In the embodiment of FIG. 2, the thread grooves 115 and the threads 145 can be a bidirectional screwing structure. In detail, when the counterweight 140 is to be disassembled, the counterweight 140 is rotated counterclockwise and removed from the accommodating body 110. When the counterweight 140 is to be assembled with the accommodating body 110, the threads 145 of the counterweight 140 are aligned with the thread grooves 115 of the accommodating body 110, and the counterweight 140 is rotated clockwise to screw the threads 145 to the thread grooves 115. With the above structural arrangement, the operation of switching the state of the pet feeding device 100 can be more simple and convenient. It should be mentioned that, in other embodiments, the counterweight 140 can be detachably connected to the accommodating body 110 by magnetic manner or other manner, and the present disclosure will not be limited thereto.

In order to connect the cover 120 to the accommodating body 110 more firmly, the cover 120 can further include a fixing latch 122. When the accommodating body 110 of the pet feeding device 100 is closed, the fixing latch 122 can limit the relative position of the cover 120 and the accommodating body 110, so as to prevent the cover 120 being separated from the accommodating body 110 due to collision. Therefore, the stability of the pet feeding device 100 can be increased.

The pet feeding device 100 can further include a releasing hole 112. In the embodiment of FIG. 1, the releasing hole 112 is opened on the cover 120. In other embodiments, the releasing hole 112 can be opened on the accommodating body 110, and the present disclosure will not be limited thereto. In detail, when the pet feeding device 100 is in the rolling state and the accommodating space 111 is closed by the cover 120 (as shown in FIG. 3A), the pet pushes the pet feeding device 100 to make the feed fallout from the accommodating space 111 through the releasing hole 112, and the pet feeding device 100 can be used as a leaking ball. Further, the smell of the feed in the accommodating space 111 can overflow from the releasing hole 112, so as to attract the pet and increase the desire for activities. Therefore, the pet feeding device 100 can provide the interactive feeding function to have both entertainment and feeding functions, and the desire for activities and the appetite of the pet can be increased.

The pet feeding device 100 can further include a hole cover 113 slidably connected to the releasing hole 112. The hole cover 113 is for controlling the opening and closing of the releasing hole 112. The opening degree of the releasing hole 112 can be controlled by sliding the hole cover 113, so as to control the amount of feed falling out. When the releasing hole 112 is completely covered by the hole cover 113, the feed cannot fall from the releasing hole 112, and the pet feeding device 100 can be used as a pet toy. Therefore, the owner can control the size of the releasing hole 112 according to the requirements of the usage mode to provide the pet the entertainment function or the feeding functions, and the application range of the pet feeding device 100 can be expanded.

The accommodating body 110 and the cover 120 can be made of transparent materials. Accordingly, the owner can observe the feed situation in the accommodation space 111 of the pet feeding device 100. Therefore, the owner can supplement the feed according to the amount of the feed in the accommodating space 111, and the convenience of the pet feeding device 100 can be increased.

Figure 4:
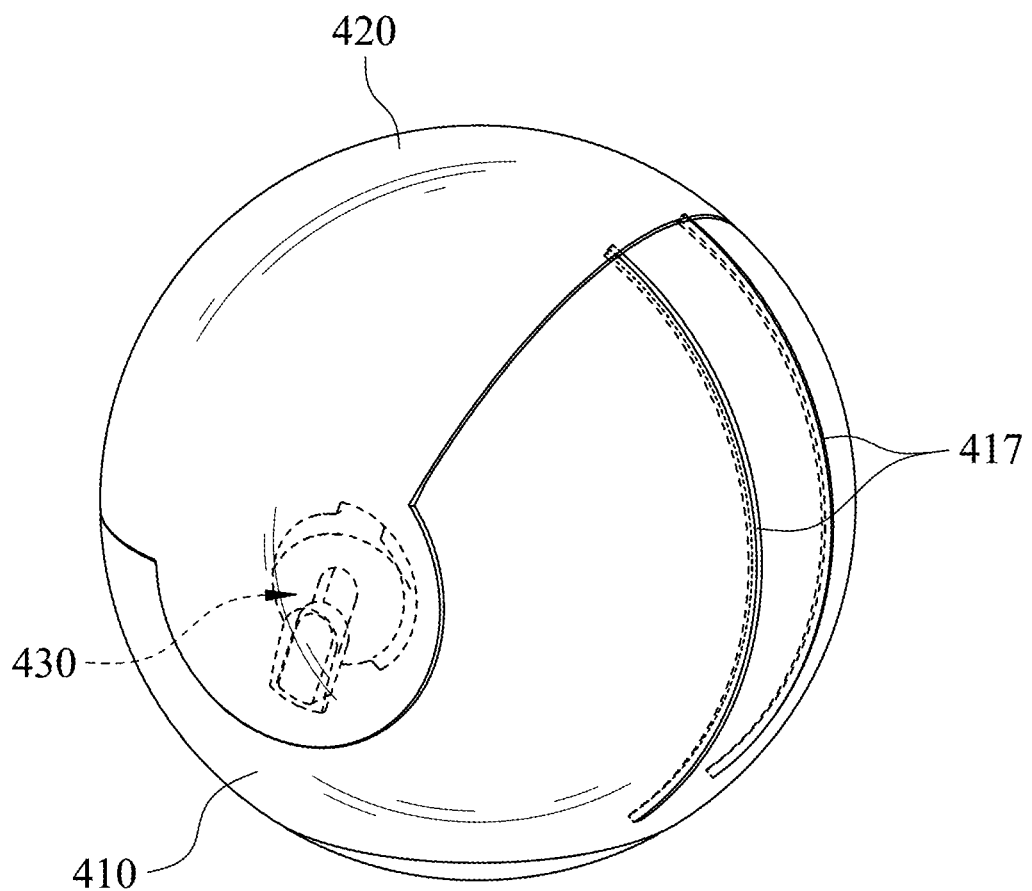
FIG. 4 is a schematic view of a pet feeding device according to another embodiment of the present disclosure.

FIG. 4 is a schematic view of a pet feeding device 400 according to another embodiment of the present disclosure. The structure of the pet feeding device 400 in FIG. 4 is similar to the structure of the pet feeding device 100 in FIG. 1, and the similarities will not be described herein again. The difference is that rails 417 are disposed on the outer surface of the accommodating body 410 of the pet feeding device 400. A sliding element (not shown) is disposed on an inner surface of the cover 420, and the sliding element is slidably connected in the rails 417.

In detail, the disposing position of the sliding element corresponds to the disposing position of the rails 417. When the cover 420 slides relative to the accommodating body 410 through the pivoting assemblies 430, the sliding element slides in the rails 417. Therefore, the pivoting operation of the cover 420 can be smoother and more stable.

Figure 5A:
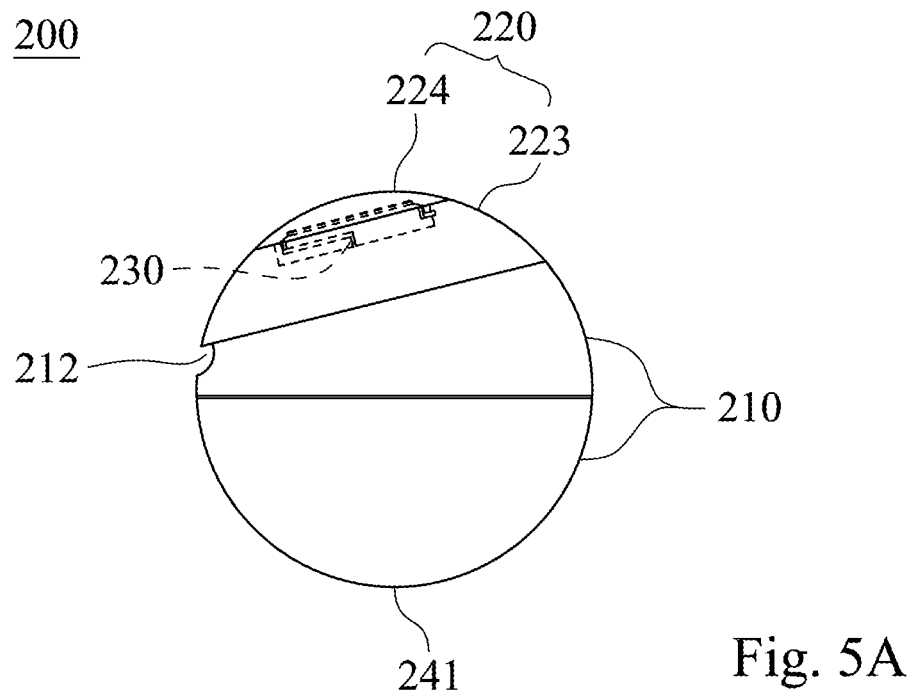
FIG. 5A is a side view of a pet feeding device according to still another embodiment of the present disclosure.
Figure 5B:
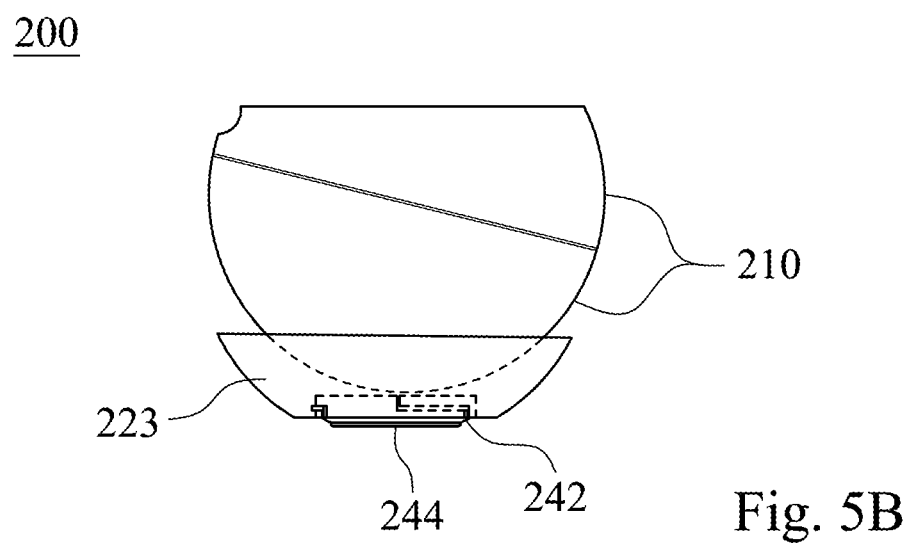
FIG. 5B is a side view of another state of the pet feeding device of FIG. 5A.

FIG. 5A is a side view of a pet feeding device 200 according to still another embodiment of the present disclosure. FIG. 5B is a side view of another state of the pet feeding device 200 of FIG. 5A. The pet feeding device 200 includes an accommodating body 210, a cover 220 and a counterweight 230.

The accommodating body 210 has an accommodating space (its reference numeral is omitted) for filling feed. The cover 220 is detachably connected to the accommodating body 210 and to close or open the accommodating space. The counterweight 230 is connected to the cover 220. When the accommodating space is closed by the cover 220, the pet feeding 200 device is in a rolling state, and when the accommodating space is opened by the cover 220 and the cover 220 is assembled on one end of the accommodating body 210 after being separated, the pet feeding device 200 is in a positioning state.

The cover 220 can include a first combination element 223 and a second combination element 224. The first combination element 223 is detachably connected to the accommodating body 210. The second combination element 224 is detachably connected to the first combination element 223.

In FIG. 5A, the pet feeding device 200 includes a swinging end 241 and a positioning end 242. The swinging end 241 has a curved surface and is disposed on one end of the accommodating body 210. The positioning end 242 is disposed on one end of the first combination element 223. The counterweight 230 is disposed on the positioning end 242. When the swinging end 241 contacts a ground, the pet feeding device 200 is in the rolling state (as shown in FIG. 5A) and shakes irregularly like the tumbler. When the positioning end 242 contacts the ground, the pet feeding device 200 is fixed on the ground and is in the positioning state (as shown in FIG. 5B).

Further, the counterweight 230 is connected to the first combination element 223. When the pet feeding device 200 is in the rolling state, the center of gravity of the pet feeding device 200 deviates from the center thereof, so that the pet feeding device 200 can swing stably. When the pet feeding device 200 is in the positioning state, the pet feeding device 200 can be connected to the ground more stably through the counterweight 230, so as to avoid being dumped by collision.

The counterweight 230 can include a magnet assembly (not shown) and a suction cup 244. The suction cup 244 is disposed on the positioning end 242, and is exposed on the counterweight 230. The suction cup 244 is linked with the magnet assembly. When the magnet assembly is forced, the magnet assembly drives the suction cup 244 being in an attaching state or a non-attaching state. In FIG. 5A, the positioning end 242 is forced to force the magnet assembly, and the magnet assembly drives the suction cup 244 to be in the attaching state. When the force on the positioning end 242 is released, the force on the magnet assembly is released, and the magnet assembly drives the suction cup 244 to be in the non-attaching state. It should be mentioned that, the structure of the counterweight 230 of the pet feeding device 200 is same as the structure of the counterweight 140 of the pet feeding device 100, and the detailed structure thereof will not be described herein again.

When the owner wants to switch the pet feeding device 200 from the rolling state to the positioning state, the end of the first combination element 223 with the suction cup 244 is contacted to the ground, and the accommodating body 210 is placed in a space (its reference numeral is omitted) of the first combination element 223 of the cover 220. At this time, the pet feeding device 200 can be used as a pet bowl.

The state of the pet feeding device 200 can be switched by disassembling and changing the relative relationship of the first combination element 223 and the second combination element 224. Therefore, the flexibility of using the pet feeding device 200 can be enhanced.

In FIG. 5A, the second combination element 224 of the pet feeding device 200 can be a soft protective element. The second combination element 224 covers the first combination element 223 to avoid damaging the suction cup 244 of the counterweight 230 during the pet interacting with the pet feeding device 200.

In addition, the connection relationship of the first combination element 223, the second combination element 224 and the accommodating body 210 can be screwing, magnetic connecting or engaging, but the present disclosure will not be limited therein. Therefore, the operation of disassembling and assembling the pet feeding device 200 can be more conveniently.

As shown in FIG. 5A, the accommodating body 210, the cover 220 and the counterweight 230 can have the same radius of curvature. The pet feeding device 200 in the rolling state in FIG. 5A can be used as a ball toy for pet entertainment. The pet feeding device 200 can further include a releasing hole 212 opened on the accommodating body 210. When the pet feeding device 200 is in the rolling state, the pet pushes the pet feeding device 100 to make the feed falling out from the accommodating space through the releasing hole 212. Further, the smell of the feed in the accommodating space can overflow from the releasing hole 212, so as to increase the desire for activities of the pet. Therefore, the pet feeding device 200 can provide the interactive feeding function to have both entertainment and feeding functions, and the desire for activities and the appetite of the pet can be increased.

Figure 6A:
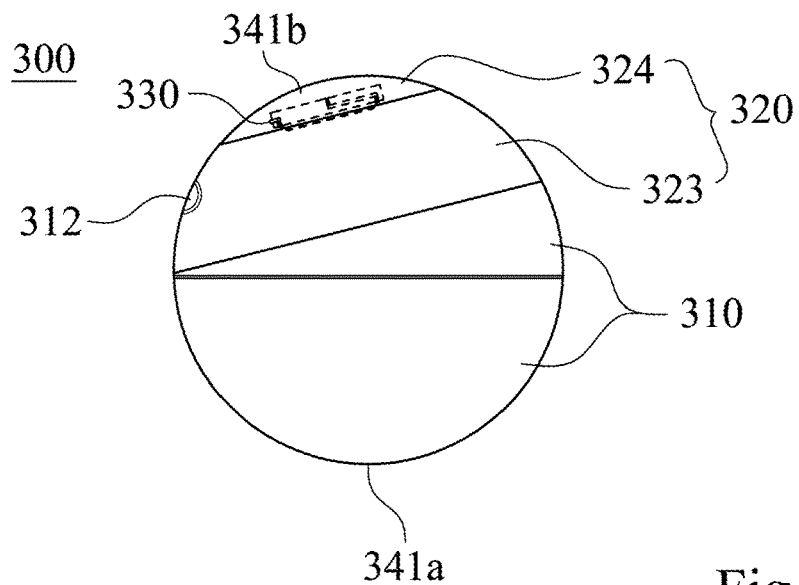
FIG. 6A is a side view of a pet feeding device according to further another embodiment of the present disclosure.
Figure 6B:
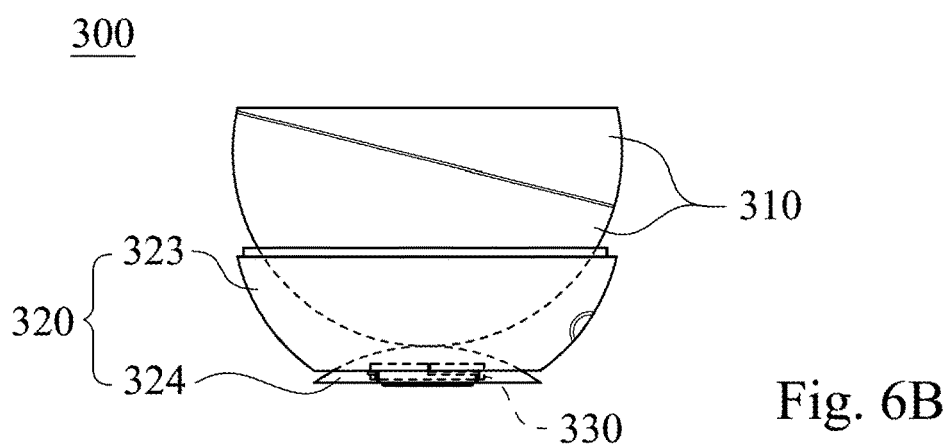
FIG. 6B is a side view of another state of the pet feeding device of FIG. 6A.
Figure 6C:
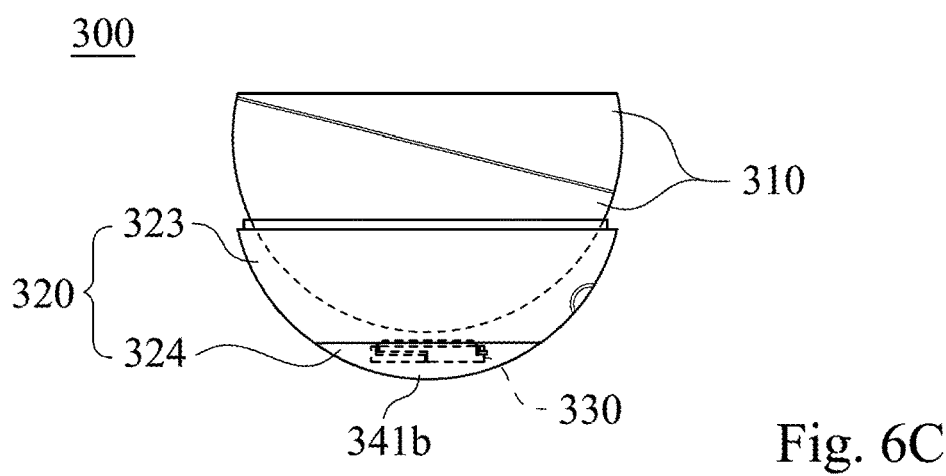
FIG. 6C is a side view of still another state of the pet feeding device of FIG. 6A.

FIG. 6A is a side view of a pet feeding device 300 according to further another embodiment of the present disclosure. FIG. 6B is a side view of another state of the pet feeding device 300 of FIG. 6A. FIG. 6C is a side view of still another state of the pet feeding device 300 of FIG. 6A. The pet feeding device 300 includes an accommodating body 310, a cover 320 and a counterweight 330. The cover 320 can include a first combination element 323 and a second combination element 324.

Specifically, the structure of the pet feeding device 300 in FIG. 6A is similar to the structure of the pet feeding device 200 in FIG. 5A, and the similarities will not be described herein again. In FIG. 6A, the counterweight 330 of the pet feeding device 300 is connected to one end of the second combination element 324. The pet feeding device 300 can be in a rolling state (as shown in FIGS. 6A and 6C) or a positioning state (as shown in FIG. 6B) by changing the relative positions of the first combination element 323 and the second combination element 324 with the accommodating body 310.

Further, the pet feeding device 300 can have a first swinging end 341a and a second swinging end 341b. The first swinging end 341a is disposed on the accommodating body 310. The second swinging end 341b is disposed on the other end of the second combination element 324. When the first swinging end 341a or the second swinging end 341b contacts to the ground, the pet feeding device 300 is in the rolling state (as shown in FIGS. 6A and 6C). When the end having the counterweight 330 of the second combination element 324 contacts to the ground, the pet feeding device 300 is in the positioning state (as shown in FIG. 6B).

In detail, in FIG. 6A, the first swinging end 341a contacts to the ground. At this time, the pet feeding device 300 rolls and can be used as a ball toy for entertaining pet. The feed can fall out from the releasing hole 312 to increase the interest of the pet in the pet feeding device 300. In FIG. 6B, the accommodating body 310 is placed to a space (its reference numeral is omitted) of the first combination element 323 of the cover 320, so as to open the accommodating space (its reference numeral is omitted) of the accommodating body 310, and it can be used as a pet bowl. The positioning end 342 of the second combination element 324 is connected to the ground so as to increase the stability of the pet feeding device 300 when it is used as the pet bowl. In FIG. 6C, the second swinging end 341b of the second combination element 324 is contacted to the ground, the pet feeding device 300 can be shaken like a tumbler by the counterweight 330, and the pet feeding device 300 can be used as the pet bowl in the rolling state. Therefore, the joy of the pet using the pet feeding device 300 can be enhanced.

In summary, the pet feeding device of present disclosure can be used in different states and different modes to satisfy the wide application needs of the owner by changing the structural relationship between the counterweight and the accommodating body. Further, the structure of the pet feeding device of present disclosure is simple, and the operation of disassembling and assembling the pet feeding device is convenient. Therefore, the convenience and flexibility of using the pet feeding device of present disclosure can be improved.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A pet feeding device, comprising:
   an accommodating body having an accommodating space;
   a cover pivotally connected to the accommodating body and to close or open the accommodating space;
   a pivoting assembly connected to the accommodating body and the cover and for pivotally connecting the cover on the accommodating body; and
   a counterweight separately connected to the accommodating body and comprising:
      a swinging end having a curved surface and disposed on one end of the counterweight; and
      a positioning end disposed on the other end of the counterweight;
   wherein when the swinging end of the counterweight contacts a ground, the pet feeding device is in a rolling state, and when the positioning end of the counterweight contacts the ground, the pet feeding device is in a positioning state;
   wherein when the counterweight is connected to the accommodating body in such a manner that the swinging end of the counterweight faces outwardly, the curved surface of the swinging end forms a part of an outer surface of the pet feeding device;
   wherein when the counterweight is connected to the accommodating body in such a manner that the swinging end of the counterweight faces outwardly, and the cover is pivoted to close the accommodating space, the outer surface of the pet feeding device is substantially spherical; and
   wherein when the counterweight is connected to the accommodating body in such a manner that the positioning end of the counterweight faces outwardly, and the cover is pivoted to close the accommodating space, the outer surface of the pet feeding device is formed as a truncated sphere.

2. The pet feeding device of claim 1, wherein the counterweight further comprises:
   a magnet assembly; and
   a suction cup disposed on the positioning end and linked with the magnet assembly;
   wherein the magnet assembly is forced to drive the suction cup being in an attaching state or an non-attaching state.

3. The pet feeding device of claim 1, wherein the accommodating body, the cover and the counterweight have the same radius of curvature, and the accommodating body, the cover and the counterweight are spherical after being completely combined.

4. The pet feeding device of claim 1, wherein the pivoting assembly comprises:
   a shaft element connected to the accommodating body and the cover; and
   a pivoting element connected to the shaft element and driving the cover to pivot.

5. The pet feeding device of claim 1, further comprising:
   a releasing hole opened on the accommodating body or the cover.

6. The pet feeding device of claim 1, wherein a rail is disposed on an outer surface of the accommodating body, a sliding element is disposed on an inner surface of the cover, and the sliding element is slidably connected in the rail.

7. A pet feeding device, comprising:
   an accommodating body having an accommodating space;
   a cover detachably connected to the accommodating body to close or open the accommodating space; and
   a counterweight connected to the cover and comprising:
      a swinging end having a curved surface and disposed on one end of the counterweight; and
      a positioning end disposed on the other end of the counterweight;
   wherein when the cover closes the accommodating space, the pet feeding device is in a rolling state, and when the cover opens the accommodating space and the cover is assembled on one end of the accommodating body after being separated, the pet feeding device is in a positioning state;
   wherein when the counterweight is connected to the cover in such a manner that the swinging end of the counterweight faces outwardly, the curved surface of the swinging end forms a part of an outer surface of the pet feeding device;
   wherein when the counterweight is connected to the cover in such a manner that the swinging end of the counterweight faces outwardly, and the cover closes the accommodating space, the outer surface of the pet feeding device is substantially spherical; and
   wherein when the counterweight is connected to the cover in such a manner that the positioning end of the counterweight faces outwardly, and the cover opens the accommodating space, the outer surface of the pet feeding device is formed as a truncated sphere.

8. The pet feeding device of claim 7, wherein the cover further comprises:
   a first combination element detachably connected to the accommodating body; and
   a second combination element detachably connected to the first combination element.

9. The pet feeding device of claim 8, wherein the counterweight is connected to one end of the first combination element or one end of the second combination element.

10. The pet feeding device of claim 7, wherein the counterweight comprises:
    a magnet assembly; and
    a suction cup exposed to the counterweight and linked with the magnet assembly;
    wherein the magnet assembly is forced to drive the suction cup being in an attaching state or an non-attaching state.

11. The pet feeding device of claim 7, wherein the accommodating body, the cover and the counterweight have the same radius of curvature, and the accommodating body, the cover and the counterweight are spherical after being completely combined.

12. The pet feeding device of claim 7, further comprising:
a releasing hole opened on the accommodating body or the cover.

* * * * *